United States Patent Office 3,499,082
Patented Mar. 3, 1970

3,499,082
HYPOTENSIVE COMPOSITIONS CONTAINING A 3,4 - DIHYDRO - 1,2,4 - BENZOTHIADIAZINE-1,1-DIOXIDE, A HYDRAZINO-PHTHALAZINE AND AN INDOLE ALKALOID OF THE APOCYNACEAE FAMILY
George De Stevens and Lincoln Harvey Werner, Summit, N.J., assignors to Ciba Corporation, New York, N.Y., a corporation of Delaware
No Drawing. Continuation-in-part of application Ser. No. 586,390, Oct. 13, 1966. This application Jan. 4, 1967, Ser. No. 607,157
The portion of the term of the patent subsequent to Nov. 29, 1983, has been disclaimed
Int. Cl. A61k 27/00
U.S. Cl. 424—246
9 Claims

ABSTRACT OF THE DISCLOSURE

Pharmaceutical compositions comprising essentially:
(1) A 3,4-dihydro-1,2,4-benzothiadiazine-1,1-dioxide,
(2) A 1-hydrazino-phthalazine, and
(3) An indole alkaloid of the Apocynaceae family
particularly the composition of 6-chloro-7-sulfamyl-3,4-dihydro-2H - 1,2,4 - benzothiadiazine-1,1-dioxide, 1-hydrazino-phthalazine and reserpine, are useful in the treatment of hypertension.

CROSS-REFERENCES

This is a continuation-in-part of application Ser. No. 586,390, filed Oct. 13, 1966, which in turn is a continuation-in-part of application Ser. No. 343,113, filed Feb. 6, 1964, which in turn is a continuation-in-part of application Ser. No. 149,496, filed Nov. 2, 1961, which in turn is a continuation-in-part of application Ser. No. 791,799, filed Feb. 9, 1959, which in turn is a continuation-in-part of application Ser. No. 764,482, filed Sept. 29, 1958, which in turn is a continuation-in-part of application Ser. No. 751,620, filed July 29, 1958, which in turn is a continuation-in-part of application Ser. No. 740,582, filed June 9, 1958, which in turn is a continuation-in-part of application Ser. No. 727,242, filed Apr. 9, 1958, which in turn is a continuation-in-part of application Ser. No. 718,-452, filed Mar. 3, 1958, all of which, except Ser. Nos. 343,113 and 586,390, are now abandoned. Application Ser. No. 343,113 has now matured into United States Patent No. 3,340,150 and Ser. No. 586,390 is now abandoned.

SUMMARY

The present invention concerns and has for its object the provision of pharmaceutical compositions, useful in the treatment of hypertension, containing as the active ingredients the compounds listed above under items (1), (2) and (3), methods for their preparation, as well as a method of treatment of hypertension with the use of said compositions.

DESCRIPTION

The 3,4-dihydro - 1,2,4 - benzothiadiazine-1,1-dioxides used in the invention contain in the carbocyclic portion a sulfamyl group and, in addition thereto, in the same and/or the heterocyclic portion an unsubstituted or substituted hydrocarbon radical, an amino, nitro, or etherified hydroxyl group, or especially a halogen atom or a trifluoromethyl group.

More particularly said compounds are represented by the Formula I

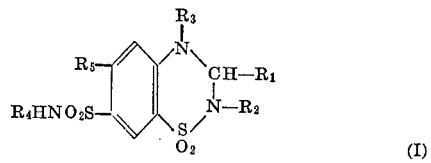

in which $R_1$ stands for hydrogen, an unsubstituted or substituted hydrocarbon radical or a heterocyclic group, each of $R_2$, $R_3$ and $R_4$ for hydrogen or an unsubstituted or substituted hydrocarbon radical and $R_5$ for an aliphatic hydrocarbon radical, a halogenated hydrocarbon radical, especially a trifluoromethyl group, or particularly a halogen atom, especially chlorine.

A hydrocarbon radical $R_1$ represents, for example, a lower aliphatic hydrocarbon radical, such as lower alkyl, e.g. methyl, ethyl, propyl, isopropyl, butyl, isobutyl, sec. butyl, tert. butyl, pentyl, isopentyl, or neopentyl, lower alkenyl, e.g. vinyl or 1-propenyl, lower alkynyl, e.g. ethinyl, a carbocyclic aliphatic hydrocarbon radical or a carbocylclic aliphatic hydrocarbon-lower aliphatic hydrocarbon radical which contains from three to seven ring-carbon atoms and one to seven chain-carbon atoms and in which the carbocyclic portion is saturated or contains one or two double bonds depending on the number of ring-carbon atoms, such a cycloalkyl or cycloalkenyl containing preferably from five to six ring-carbon atoms, e.g. cyclopentyl, cyclohexyl, 2-cyclopentenyl, 3-cyclopentenyl, 2-cyclohexenyl or 3-cyclohexenyl, or cycloalkyl-lower alkyl or cycloalkenyl-lower alkyl containing preferably from five to six ring-carbon atoms, e.g. cyclopentylmethyl, 1- or 2-cyclopentylethyl, 1- or 3-cyclopentylpropyl, cyclohexylmethyl, 1- or 2-cyclohexylethyl, 1- or 3-cyclohexylpropyl, 2- or 3-cyclopentenylmethyl, 1- or 2-(2-cyclopentenyl)-ethyl, 1- or 2-(3-cyclopentenyl)-ethyl, 1- or 3-(2-cyclopentenyl)-propyl, 1-(3-cyclopentenyl)-propyl, 2- or 3-cyclohexenylmethyl, 1- or 2-(2-cyclohexenyl)-ethyl, 1- or 2-(3-cyclohexenyl)-ethyl, 1- or 3-(2-cyclohexenyl)-propyl or 1- or 3-(3-cyclohexenyl)-propyl.

These aliphatic hydrocarbon radicals may contain additional substituents. Such substituents are primarily attached to lower alkyl radicals, and may be represented by lower alkylene containing from one to five carbon atoms, such as methylene, 1,1- or 1,2-ethylene, 1-1-dimethyl-1,2-ethylene, 1,1-, 1,2-, 1,3- or 2,2-propylene, 1,1-, 1,2-, 1,3-, 1,4-, 2,2- or 2,3-butylene, 1,5- or 2,5-pentylene.

Other substituents are, for example, one or more than one halogen atoms, e.g. fluorine, bromine, or particularly chlorine; halogeno-substituted lower alkyl radicals, representing $R_1$, are, for example, chloromethyl, 2-chloroethyl, dichloromethyl, trichloromethyl or bromomethyl.

Other substituents are amino groups, for example, primary or secondary amino groups, such as lower alkylamino, e.g. methylamino or ethylamino, carbocyclic arylamino, e.g. phenylamino, or carbocyclic aryl-lower alkylamino, e.g. benzylamino, or primarily tertiary amino groups, particularly di-lower alkylamino, e.g. dimethylamino, N-methyl-N-ethylamino, diethylamino, dipropylamino, di-isopropylamino or dibutylamino, N-lower alkyl-N-cycloalkylamino, e.g. N-methyl-N-cyclopentylamino or N-methyl-N-cyclohexylamino, N-lower alkyl-N-carbocyclic arylamino, e.g. N-methyl-N-benzylamino or N-methyl-N-(2-phenylethyl)-amino, lower alkyleneimino, in which lower alkylene has preferably from four to six carbon atoms, such as pyrrolidino, 2-methyl-pyrrolidino, piperidino, 2-, 3- or 4-methyl-piperidino, 3-hydroxy-piperidino, 3-acetoxy-piperidino, 3-hydroxymethyl-piperidino or hexamethyleneimino, lower oxa- or azaalkyleneimino, in which alkylene contains preferably four carbon atoms, e.g. morpholino, or piperazino, 4-methyl-piperazino, 4-hydroxyethyl-piperazino or 4-acetoxyethyl-piperazino. The tertiary amino group and the lower alkyl radical to which the amino group is attached may represent together a heterocyclic radical, in which the tertiary amino group is part of the heterocyclic ring and one of the carbon atoms thereof is connected directly or through a lower alkylene radical, e.g. methylene or 1,2-ethylene, with the 3-position of the 3,4-dihydro-1,2,4-thiadiazine-1,1-dioxide portion. Such radicals are, for example, 1-methyl-3-piperidyl-methyl, 2-(1 - methyl-2-piperidyl)-ethyl or 1-methyl-4-piperidyl.

Substituents attached to aliphatic hydrocarbon, particularly lower alkyl, radicals $R_1$ are also N-acylamino groups, in which acyl is derived or organic carboxylic acids, for example, substituted carbonic acids, e.g. methoxy-, ethoxy- or benzyloxy-carbonic acid, lower aliphatic carboxylic acids, such as lower alkanoic acids, e.g. acetic, propionic or pivalic acid, lower alkenoic acids, e.g. acrylic or methacrylic acid, lower aliphatic dicarboxylic acids, e.g. oxalic, malonic, succinic, glutaric, adipic, maleic or fumaric acid or their halfesters with lower alkanols, e.g. methanol or ethanol, carboxylic arylcarboxylic acids, e.g. benzoic or substituted benzoic acids, carbocyclic aryl-lower aliphatic carboxylic acids, particularly aryl-lower alkanoic or alkenoic acids, e.g. phenylacetic, dihydrocinnamic or cinnamic acid, which may contain additional substituents especially in the aromatic portion. Substituents attached to these carboxylic acids are, for example, lower alkyl, e.g. methyl or ethyl, lower alkoxy, e.g. methoxy or ethoxy, lower alkylenedioxy, e.g. methylenedioxy, lower alkylmercapto, e.g. methylmercapto, sulfamyl, nitro, amino, particularly tertiary amino, such as di-lower alkylamino, e.g. dimethylamino or diethylamino, halogen, e.g. fluorine, chlorine or bromine, or halogeno-lower alkyl, e.g. trifluoromethyl. These substituents may be attached to any of the available positions; for example, monocyclic carbocyclic aryl radicals may be substituted in the ortho-, meta- or para-positions, whereby one or more than one of the same or of different substituents may be present.

Acyl groups are additional substituents of aliphatic hydrocarbon, particularly lower alkyl, radicals $R_1$, primarily acyl radicals of organic carboxylic acids, such as those mentioned for the N-acylamino groups.

Other substituents attached to aliphatic hydrocarbon, particularly lower alkyl, radicals $R_1$, are hydroxyl groups. Esterified hydroxyl groups may also be suitable as substituents, especially hydroxyl groups esterified by organic carboxylic acids, for example, those mentioned above.

Further substituents of aliphatic hydrocarbon, particularly lower alkyl, radicals $R_1$, are etherified hydroxyl groups, which may be represented, for example, by aliphatic hydrocarbonoxy, such as lower alkoxy, e.g. methoxy, ethoxy, n-propoxy, isopropoxy, n-butoxy or isobutoxy, lower alkenyloxy, e.g. vinyloxy or allyloxy, carbocyclic aryloxy, e.g. phenoxy or substituted phenoxy, 1- or 2-naphthoxy or substituted naphthoxy, or carbocyclic aryl-aliphatic hydrocarbonoxy, such as aryl-lower alkoxy, e.g. benzyloxy or substituted benzyloxy. The aliphatic hydrocarbon, and particularly the carbocyclic aryl portions of the etherified hydroxy groups may contain additional substituents; such substituents are, for example, those mentioned for the carboxylic acids above.

In addition, aliphatic hydrocarbon, particularly lower alkyl, radicals $R_1$, may be substituted by an etherified mercapto group, for example, aliphatic hydrocarbonmercapto, such as lower alkylmercapto, e.g. methylmercapto, ethylmercapto, n-propylmercapto, isopropylmercapto, n-butylmercapto or isobutylmercapto lower alkenylmercapto, e.g. vinylmercapto or allylmercapto, carbocyclic arylmercapto, e.g. phenylmercapto or substituted phenylmercapto, 1- or 2-naphthylmercapto or substituted naphthylmercapto, or carbocyclic aryl-aliphatic hydrocarbon-mercapto, such as aryl-lower alkylmercapto, e.g. benzylmercapto, 1- or 2-phenylethylmercapto or corresponding substituted radicals as shown for the carboxylic acids above.

Apart from aliphatic hydrocarbon radicals, $R_1$ may represent carbocyclic aryl groups, such as monocyclic or bicyclic carbocyclic aryl, e.g. phenyl or substituted phenyl, 1- or 2-naphthyl or substituted naphthyl radicals, or carbocyclic aryl-aliphatic hydrocarbon radicals, particularly monocyclic or bicyclic carbocyclic aryl-lower alkyl, e.g. benzyl, 1- or 2-phenylethyl, 3-phenylpropyl or 1-naphthylmethyl, or these radials substituted especially in the aromatic portion, for example by those radicals mentioned for the carboxylic acids above.

Additional groups representing $R_1$ are heterocyclic aryl radicals, particularly monocyclic or bicyclic heterocyclic aryl radicals, such as pyridyl, e.g. 2-, 3- or 4-pyridyl, thienyl, e.g. 2-thienyl, furyl, e.g. 2-furyl, or quinolyl, e.g. 6-quinolyl, or heterocyclic aryl-aliphatic hydrocarbon radicals, such as monocyclic heterocyclic aryl-lower alkyl, for example, thenyl, e.g. 2-thenyl. These radicals may contain additional substituents, particularly lower alkyl, e.g. methyl or ethyl, lower alkoxy, e.g. methoxy or ethoxy, or halogen, e.g. fluorine, chlorine or bromine.

The radicals $R_2$, $R_3$ and $R_4$, apart from being primarily hydrogen, may also represent lower aliphatic hydrocarbon radicals, such as lower alkyl, e.g. methyl, ethyl, propyl or isopropyl; monocyclic or bicyclic carbocyclic aryl, e.g. phenyl or 1- or 2-naphthyl; monocyclic or bicyclic carbocyclic aryl-lower alkyl, e.g. benzyl, 1-naphthyl-methyl or 2-naphthyl-methyl; or these radicals containing substituents such as those specifically mentioned for the radical $R_1$; substituted radicals are, for example, hydroxymethyl or 2-hydroxyethyl.

The radical $R_5$ stands primarily for halogen, e.g. fluorine, bromine or particularly chlorine. In addition, it may also represent lower aliphatic hydrocarbon, for example, lower alkyl, e.g. methyl or ethyl, or advantageously a substituted lower aliphatic hydrocarbon, such as a halogeno-lower alkyl radical, particularly trifluoromethyl.

Salts of the 3,4-dihydro-1,2,4-benzothiadiazine-1,1-dioxides which may also be used in this invention, are therapeutically useful salts with metals, particularly the alkali metal salts, such as those with sodium or potassium. These compounds are also described in U.S. Patent Nos. 3,163,644 and 3,163,645.

3,4-dihydro-1,2,4-benzothiadiazine-1,1-dioxides particularly useful in the invention, are those of the Formula I in which $R_1$ stands for hydrogen, lower alkyl, lower alkenyl, cycloalkyl and cycloalkyl-lower alkyl with 3 to 6 ring-carbon atoms, cycloalkenyl and cycloalkenyl-lower alkyl with 5 to 6 ring-carbon atoms, halogeno-lower alkyl, di-lower alkylamino-lower alkyl, lower alkanoyl-lower alkyl, lower alkoxy-lower alkyl, halogeno-lower alkoxy-lower alkyl, monocyclic carbocyclic aryloxy-lower alkyl, lower alkylmercapto-lower alkyl, halogeno-lower alkyl-mercapto-lower alkyl, monocyclic aryl-mercapto-lower alkyl, monocyclic aryl-lower alkylmercapto-lower alkyl, monocyclic carbocyclic aryl or aryl-lower alkyl, $R_2$, $R_3$ and $R_4$ each for hydrogen or lower alkyl, e.g. methyl, and $R_5$ for halogen, particularly chlorine, lower alkyl, e.g. methyl, or halogeno-lower alkyl, e.g. trifluoromethyl.

Especially valuable are those compounds of the Formula I in which each of $R_2$, $R_3$ and $R_4$ stands for hydrogen and:

(a) $R_1$ for hydrogen and $R_5$ for halogen, particularly chlorine, (b) $R_1$ for lower alkyl or aryl-lower alkyl, and $R_5$ for halogen, particularly chlorine, (c) $R_1$ for halogeno-lower alkyl, and $R_5$ for halogen, particularly chlorine, or halogeno-lower alkyl, particularly trifluoromethyl, (d) $R_1$ for amino-lower alkyl and $R_5$ for halogen, particularly chlorine, (e) $R_1$ for hydroxy-lower alkyl, acyloxy-lower alkyl or etherified hydroxy-lower alkyl and $R_5$ for halogen, particularly chlorine, (f) $R_1$ for a carbocyclic alicyclic hydrocarbon radical or a carbocyclic alicyclic hydrocarbon-lower aliphatic hydrocarbon radical, and $R_5$ for halogen, particularly chlorine, (g) $R_1$ for etherified mercapto-lower alkyl and $R_5$ for halogen, particularly chlorine, and (h) $R_1$ for monocyclic carbocyclic aryl-lower alkyl, and $R_5$ for halogen, especially for chlorine, and those N-derivatives of these compounds, in which one, two or all three of $R_2$, $R_3$ and $R_4$ stand for lower alkyl, particularly methyl, or the acyl radical of a carbonic or lower alkanoic acid, e.g. ethyl carbonic or acetic acid.

Another group of valuable 3,4-dihydro-1,2,4-benzothiadiazine-1,1-dioxides useful in the invention are those of the Formula II

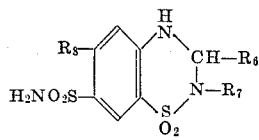

(II)

in which $R_8$ stands for chlorine or trifluoromethyl and:

(a) $R_6$ for hydrogen and $R_7$ for lower alkyl, (b) each of $R_6$ and $R_7$ for lower alkyl, (c) $R_6$ for halogeno-lower alkyl and $R_7$ for lower alkyl, (d) $R_6$ for phenyl-lower alkyl and $R_7$ for lower alkyl, (e) $R_6$ for hydrogen and $R_7$ for allylic lower alkenyl, (f) $R_6$ for lower alkyl and $R_7$ for allylic lower alkenyl, (g) $R_6$ for halogeno-lower alkyl and $R_7$ for allylic lower alkenyl, (h) $R_6$ for phenyl-lower alkyl and $R_7$ for allylic lower alkenyl, (i) $R_6$ for hydrogen and $R_7$ for phenyl-lower alkyl, (j) $R_6$ for lower alkyl and $R_7$ for phenyl-lower alkyl, (k) $R_6$ for halogeno-lower alkyl and $R_7$ for phenyl-lower alkyl, and (l) each of $R_6$ and $R_7$ for phenyl-lower alkyl.

In the compounds of the latter group the lower alkyl moiety particularly contains from one to four carbon atoms and the allylic lower alkenyl moiety from three to five carbon atoms.

Compositions of the present invention that are outstandingly useful are those that contain as the ingredient mentioned under item (1) one of the following single compounds:

6-chloro- or 6-trifluoromethyl-7-sulfamyl-2H-3,4-dihydro-1,2,4-benzothiadiazine-1,1-dioxide and their 3-n-butyl, 3-isobutyl, 3-(2-methyl-propyl), 3-(2-ethylmercaptoethyl), 3-(benzylmercaptomethyl), 3-dichloromethyl, 3-benzyl, 3-(α-methyl-benzyl), 3-(2-phenyl-ethyl), 3-cyclopentyl, 3-cyclohexyl, 3-(3-cyclohexenyl), 3-cyclopropylmethyl, 3-cyclobutyl-methyl, 3-cyclopentylmethyl, 3-(2-cyclopentyl-ethyl), 3-(1-cyclopentyl-ethyl), 3-(5-norbornen-2-yl) and 3-thenyl derivatives as well as their 2-ethyl, 2-allyl, 2-n-propyl, 2-benzyl and 2-(2-pyranyl) derivatives and their 2-methyl-3-chloromethyl, 2-methyl-3-(2,2,2-trifluoroethylmercaptomethyl), 2-ethyl-3-dichloromethyl, 2-benzyl-3-chloromethyl and 2,7-bis-n-butylcarbamyl-3-chloromethyl derivatives.

The 1-hydrazino-phthalazines used in the invention and mentioned under item (2) are those described in U.S. Patents Nos. 2,484,029 and 2,484,785, more particularly those of Formula III

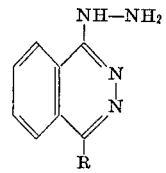

(III)

in which R stands for hydrogen, methyl or hydrazino and pharmacologically acceptable acid addition salts thereof, particularly the hydrochlorides, sulfates or methane sulfonates.

The indole alkaloids mentioned under item (3) are those described in U.S. Patents Nos. 2,752,351; 2,813,871; 2,833,771 and 2,876,228, more particularly those of Formula IV

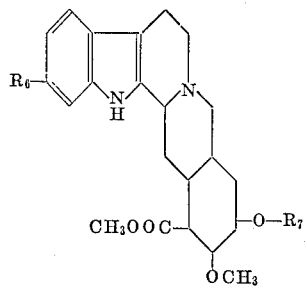

(IV)

in which $R_6$ stands for hydrogen or methoxy and $R_7$ for 3,4,5-trimethoxy-benzoyl or -cinnamoyl, or 3,5-dimethoxy-4-carbethoxy-benzoyl, and pharmacologically acceptable acid addition salts thereof. Especialy valuable are reserpine, diserpidine and rescinnamine.

In the preparation of the compositions according to the invention one may desirably use therein about 1 to 20%, preferably about 1 to 15%, particularly about 1.5 to 2.5% of the 3,4-, dihydro-1,2,4-benzothiadiazine-1,1-dioxides about 1 to 60%, preferably about 1 to 20%, particularly about 1.5 to 2.5% of the 1-hydrazino-phthalazines and about 0.005 to 0.5%, preferably about 0.01 to 0.05%, particularly about 0.01% of the indole alkaloids.

Orally applicable compositions, such as tablets, pills or capsules, may be compounded to contain about 1 to 100 mg., more particularly about 1 to 50 mg. of the 3,4-dihydro-1,2,4-benzothiadiazine-1,1-dioxides, about 10 to 150 mg., more particularly about 10 to 50 mg. of the 1-hydrazino-phthalazines and about 0.05 to 5 mg., more particularly about 0.1 to 0.5 mg. of the indole alkaloids. Advantageously, such orally applicable compositions contain about a quarter to two times the usual dosage normally applied in preparations of the single components. Tablets may, of course, be scored to provide for fractionated dosages, if desired.

A preferred composition contains (1) about 10 to 25 mg. 6 - chloro - 7 - sulfamyl-3,4-dihydro-2H-1,2,4-benzothiadiazine - 1,1 - dioxide, or about 10 to 25 mg. 6-trifluoromethyl - 7 - sulfamyl-3,4-dihydro-2H-1,2,4-benzothiadiazine-1,1-dioxide, or about 0.6 to 20 mg. 2-methyl - 3 - chloromethyl-6-chloro-7-sulfamyl-3,4-dihydro-2H-1,2,4 - benzothiadiazine-1,1-dioxide, or about 0.5 to 16 mg. 3 - dichloromethyl - 6 - chloro-7-sulfamyl-3,4-dihydro-2H - 1,2,4 - benzothiadiazine-1,1-dioxide, or about 0.25 to 8 mg. 2 - methyl-3-(2,2,2-trifluoroethylmercaptomethyl)-6 - chloro - 7 - sulfamyl-3,4-dihydro-2H-1,2,4-benzothiadiazine-1,1-dioxide, or about 0.25 to 4 mg. 3 - (5-norbornen-2-yl) - 6 - chloro-7-sulfamyl-3,4-dihydro-2H-1,2,4-benzothiadiazine - 1,1-dioxide, or about 0.6 to 100 mg. 3-benzyl-6 - trifluoromethyl - 7 - sulfamyl-3,4-dihydro-2H-1,2,4-benzothiadiazine-1,1-dioxide and (2) about 10 to 25 mg.

1-hydrazino-phthalazine or 1,4 - dihydrazino-phthalazine and (3) about 0.1 mg. reserpine or 0.4 mg. rescinnamine. It is convenient for administration and may normally be administered 1 to 3 times a day but administration may vary with the needs of each particular patient and is best determined by the physician in each case.

The formation of the composition of this invention, which may be, for example, tablets, pills, dragées or capsules, is carried out in the manner normally employed in the art, usually by combining the active ingredients mentioned under (1), (2) and (3) with pharmaceutically acceptable inorganic or organic excipients suitable especially for enteral administration. These include carriers, binders, fillers, lubricants, stabilizers, preservants, wetting agents, solution promoters or retarders, salts for regulating the osmotic pressure, buffers, colors and the like. Examples of such carrier materials are starches, e.g. corn starch, wheat starch, arrowroot starch and the like, sugars, e.g. lactose, sucrose and the like, stearic acid or salts thereof, e.g. magnesium stearate, calcium stearate and the like, aluminum magnesium silicate preparations (colloidal silica preparations), basic aluminum salts, e.g. aluminum dihydroxyallantoinate, talcum, tracgacanth, acacia, polyethylene glycol and the like. The quantities of these ingredients may vary widely and depend upon the physical characteristics (e.g. softness and the like) and size of the orally applicable composition, the method of its manufacture and the like. Encapsulation may also be effected using, if necessary, the same excipients as those employed for the manufacturing of the tablets. Any compatible color, approved and certified under the provision of the Federal Food, Drug and Cosmetic Law may be used as a means of identification and the like.

The tablet, capsule or pill for oral use may be enterically coated and such coating is effected in the standard manner, using standard enteric coating agents. Thus, agents, such as gelatin (alone or hardened with formaldehyde), cellulose esters and ethers, shellac, fats or fatty acids containing a disintegrating solid, such as magnesium oxide or other standard enteric coating materials, may be used. Preferably, one may utilize cellulose esters or esterethers, such as those described in United States Patent No. 2,196,768, as well as the procedure described therein. Other coating materials and procedures useful in the invention are those, for example, described in the United States Patent Nos. 2,071,511 and 2,205,111. Particularly satisfactory enteric coating materials are those described in the United States Patent No. 2,196,768, page 1, right-hand column, line 21, through page 2, left-hand column, line 2.

The compositions of the invention may also provide for a prolonged and sustained effect. For example, tablets, such as those described in United States Patent No. 2,887,738, may contain the pharmacologically active ingredient embedded in a pharmaceutically acceptable waxy core (for prolonged absorption in the lower intestine), around which is compressed a granulated mixture of the active ingredient together with a pharmaceutically acceptable carrier (for immediate absorption in the stomach). Or, capsules having prolonged effects may contain micro-pills containing small amounts of the pharmacologically active ingredient with coats of different rates of degradation. These long-acting preparations are prepared according to well-known methods.

If desired, the compositions of the invention may contain other therapeutically valuable substances, for example other hypotensive agents, such as guanethidines, e.g. 2-heptamethyleneimino-ethylguanidine or other related guanidines covered in United States Patent No. 2,928,829, spironolactones, e.g. 3-(3-oxo-7α-acteylthio-17β-hydroxy-4-androsten-17α-yl)-propionic acid-γ-lactone, barbiturates, e.g. sodium 5-sec.-butyl-5-ethyl-barbiturate or sodium-5-ethyl-5-phenyl-barbiturate, protoveratrines, e.g. protoveratrine A, or purines, e.g. theobromine or the theophylline choline salt.

Following are working examples, illustrative of, but in no way intended to limit the present invention. Unless otherwise indicated, all parts, wherever given in the specification are parts by weight. All sieve sizes are U.S. Standard sieve sizes.

EXAMPLE 1

| Core material and formula: | 15,000 tablets, grams |
|---|---|
| 1-hydrazino-phthalazine | 375.00 |
| Reserpine | 1.50 |
| Polyethylene gycol 6000 | 75.00 |
| Lactose U.S.P. | 1033.50 |
| Magnesium stearate U.S.P. | 15.00 |
| 50% 3A alcohol | q.s. |

Procedure for preparation

Triturate the reserpine with 100 grams of lactose and force the mixture through a No. 50 screen. Add the remainder of the lactose, the 1-hydrazino-phthalazine and the magnesium stearate and mix. Dissolve the polyethylene glycol in 90 ml. of 50% 3A alcohol and granulate the mixed powders with it, using additional 50% 3A alcohol if necessary. Pass the moist mass through a No. 10 screen and dry to 2 percent moisture, using circulating air at 110° F. Break the granules on a No. 20 screen and compress into tablets weighing 100 mg., using $8/32$ inch punches and dies on Manesty Drycota tablet press.

| Coating material and formula: | 15,000 tablets, grams |
|---|---|
| 6-chloro-3,4-dihydro-7-sulfamyl-2H-1,2,4-benzothiadiazine-1,1-dioxide (hydrochlorothiazide). | 225.00 |
| Confectioner's sugar | 150.00 |
| Polyethylene glycol 4000 monostearate | 30.00 |
| Talcum U.S.P. | 150.00 |
| Magnesium stearate U.S.P. | 30.00 |
| Corn starch | 150.00 |
| Lactose, spray dried | 2264.85 |
| FD & C Red No. 4 | 0.15 |
| 50% 3A alcohol | q.s. |

Procedure for preparation

Mix together the hydrochlorothiazide, confectioner's sugar, lactose spray dried, talc, corn starch and magnesium stearate. Dissolve the color in 150 ml. of 50% 3A alcohol and then the polyethyleneglycol. Granulate the mixed powders with this solution, using additional 50% 3A alcohol if necessary. Pass the moist mass through a No. 10 screen and dry to 3 percent moisture at 110° F. with circulating air. Break granules on a No. 14 screen and compress 200 mg. of this material around each core tablet, using $11/32$ inch punches and dies on the Manesty Drycota tablet press.

EXAMPLE 2

| Material and formula: | 10,000 tablets, grams |
|---|---|
| 6-chloro-3,4-dihydro-7-sulfamyl-2H-1,2,4-benzothiadiazine-1,1-dioxide (hydrochlorothiazide). | 250.00 |
| 1-hydrazino-phthalazine | 250.00 |
| Reserpine | 2.50 |
| Lactose U.S.P. | 2212.50 |
| Polyethylene glycol 4000 | 120.00 |
| Talc U.S.P. | 150.00 |
| Magnesium stearate U.S.P. | 15.00 |
| 50% 3A alcohol | q.s. |

Procedure for preparation

Triturate the reserpine with 100 grams of lactose and force through a No. 50 screen. Combine with the hydrochlorothiazide, 1-hydrazino-phthalazine, talc, magnesium stearate and the remainder of the lactose. Dissolve the polyethylene glycol in 180 ml. of 50% 3A alcohol, using heat. Granulate the mixed powders with this solution, using additional 50% 3A alcohol, if necessary, to complete the granulation. Pass the moist mass through a No. 8 screen and dry with circulating air at 100° F. until the moisture content is about 3 percent. Break the granules on a No. 14 screen and compress into tablets weighing 300 mg., using 12/32 inch punches and dies.

EXAMPLE 3

| Material and formula: | 10,000 tablets, grams |
|---|---|
| 6-chloro-3,4-dihydro-7-sulfamyl-2H-1,2,4-benzothiadiazine-1,1-diozide (hydrochlorothiazide). | 150.00 |
| Reserpine | 2.00 |
| 1-hydrazino-phthalazine | 500.00 |
| Lactose U.S.P. | 2018.00 |
| Tragacanth U.S.P. | 75.00 |
| 50% 3A alcohol | Q.s. |
| Corn starch | 150.00 |
| Talc U.S.P. | 90.00 |
| Magnesium stearate U.S.P. | 15.00 |

Procedure for preparation

Triturate the reserpine with 100 grams of lactose and force through a No. 50 screen. Combine this mixture with the hydrochlorothiazide, 1 - hydrazino-phthalazine, tragacanth and the remainder of the lactose and mix thoroughly. Granulate the mixed powders with the 50% 3A alcohol. Press the moist mass through a No. 8 screen and dry with circulating air at 100° F. until the moisture content is about 3.5 percent. Break the granules on a No. 12 screen and mix them with the corn starch, talc and magnesium stearate. Compress into tablets weighing 300 mg., using 12/32 inch punches and dies.

EXAMPLE 4

| Material and formula: | 10,000 tablets, grams |
|---|---|
| 6-chloro-3,4-dihydro-7-sulfamyl - 2H-1,2,4-benzothiadiazine-1,1-dioxide (hydrochlorothiazide) | 250.00 |
| Reserpine triturate 5% | 40.00 |
| 1-hydrazino-phthalazine | 500.00 |
| Gelatin | 60.00 |
| Purified water | Q.s. |
| Corn starch | 150.00 |
| Lactose U.S.P. | 1835.00 |
| Magnesium stearate U.S.P. | 15.00 |
| Talc U.S.P. | 150.00 |

Procedure for preparation

Mix together the hydrochlorothiazide, reserpine triturate, 1-hydrazino-phthalazine and lactose. Dissolve the gelatin in 300 ml. of purified water, using heat. Granulate the mixed powders with the resultant solution, using additional purified water if necessary. Pass the moist mass through a No. 8 screen and dry with circulating air at 100° F. until moisture content is 2 percent. Break the granules on a No. 12 screen and mix them with the corn starch, talc and magnesium stearate. Compress into tablets weighing 300 mg., using 12/32 inch punches and dies.

EXAMPLE 5

| Core material and formula: | 10,000 tablets, grams |
|---|---|
| 1-hydrazino-phthalazine | 100.00 |
| Mannitol | 590.00 |
| Gelatin | 15.00 |
| Purified water | Q.s. |
| Talc U.S.P. | 37.50 |
| Magnesium stearate U.S.P. | 7.50 |

Procedure for preparation

Mix thoroughly the 1-hydrazino-phthalazino and mannitol. Dissolve the gelatin in 75 ml. purified water, using heat. Granulate the mixed powders with the gelatin solution, using additional purified water as required. Pass the moist mass through a No. 8 screen and dry at 110° F. until moisture content is 1 percent. Break the granules on a No. 20 screen and mix with the talc and magnesium stearate. Compress into core tablets weighing 75 mg., using 7/32 inch punches and dies on a Manesty Drycota tablet press.

| Coating material and formula: | 10,000 tablets, grams |
|---|---|
| 6-chloro-3,4-dihydro-7-sulfamyl - 2H-1,2,4-benzothiadiazine-1,1-dioxide (hydrochlorothiazide) | 100.00 |
| Reserpine triturate 5% | 10.00 |
| Lactose, spray dried | 1307.90 |
| Corn starch (anhydrous basis) | 67.10 |
| Stearic acid powder U.S.P. | 15.00 |
| Purified water | Q.s. |
| 50% 3A alcohol | Q.s. |

Procedure for preparation

Mix together hydrochlorothiazide, reserpine triturate, lactose, 38.5 grams corn starch and stearic acid. Suspend 28.6 grams corn starch in 40 ml. purified water and make a paste by adding 200 ml. boiling water. Granulate the powders with this paste, using a mixture of equal parts of alcohol and water to complete the granulation. Pass the moist mass through a No. 8 screen and dry at 100° F. with circulating air. Break the granules on a No. 14 screen and compress 150 mg. of this material around the core tablets, using 10/32 inch punches and dies on a Manesty Drycota tablet press.

EXAMPLE 6

| Material and formula: | 10,000 tablets, grams |
|---|---|
| 6-chloro-3,4-dihydro-7-sulfamyl - 2H-1,2,4-benzothiadiazine-1,1-dioxide (hydrochlorothiazide) | 150.00 |
| 1-hydrazino-phthalazine | 1500.00 |
| Reserpine | 2.50 |
| Lactose U.S.P. | 1062.50 |
| Polyethylene glycol 4000 | 120.00 |
| Talc U.S.P. | 150.00 |
| Magnesium stearate U.S.P. | 15.00 |
| 50% 3A alcohol | Q.s. |

Procedure for preparation

Triturate the reserpine with 100 grams of lactose and force through a No. 50 screen. Combine with the hydrochlorothiazide, 1-hydrazino-phthalazine, talc, magnesium stearate and the remainder of the lactose. Dissolve the polyethylene glycol in 180 ml. of 50% 3A alcohol, using heat. Granulate the mixed powders with this solution, using additional 50% 3A alcohol, if necessary, to complete the granulation. Pass the moist mass through a No. 8 screen and dry with circulating air at 100° F. on a No. 14 screen and compress into tablets weighing 300 mg. using 12/32 inch punches and dies.

EXAMPLE 7

Using a procedure identical with that given in Example 1, but substituting an equivalent amount of deserpidine (or rescinnamine) for the reserpine of the reference example, one obtains an analogous composition.

EXAMPLE 8

Using a procedure identical with that given in Example 2, but substituting an equivalent amount of 1,4-dihydrazino-phthalazine for the 1-hydrazino-phthalazine in the reference example, one obtains an analogous composition.

EXAMPLE 9

Using a procedure identical with that given in Example 3, but substituting an equivalent amount of deserpidine (or rescinnamine) for the reserpine of the reference example and an equivalent amount of 1,4-dihydrazinophthalazine for the 1-hydrazino-phthalazine of the reference example, one obtains an analogous composition.

EXAMPLE 10

Core formulation material: Per 200.000 kg.
| | |
|---|---|
| 1-hydrazino-phthalazine hydrochloride _____kg__ | 50.000 |
| Reserpine [1]/triturate, 5% in lactose __kg__ | 4.120 |
| Acacia powder _____kg__ | 4.000 |
| Corn starch _____kg__ | 10.000 |
| Color FD & C Green No. 3 _____kg__ | 0.010 |
| Lactose, spray dried _____kg__ | 125.870 |
| Polyethylene glycol 6000 _____kg__ | 4.000 |
| Stearic acid powder _____kg__ | 2.000 |
| Deionized water _____lt__ | 22.000 |

[1] 3% excess reserpine added to compensate for alkaloid assay.

Coating formulation:
| | |
|---|---|
| 6-chloro-3,4-dihydro-7-sulfamyl-2H-1,2,4-benzothiadiazine-1,1-dioxide _kg__ | 15.000 |
| Acacia powder _____kg__ | 2.000 |
| Betose [1] _____lt__ | 2.000 |
| Color FD & C Red No. 2 _____kg__ | 0.020 |
| Color FD & C Yellow No. 5 _____kg__ | 0.010 |
| Color FD & C Yellow No. 6 _____kg__ | 0.045 |
| Lactose, spray dried _____kg__ | 168.8926 |
| Polyethylene glycol 4000 monostearate _____kg__ | 2.000 |
| Stearic acid powder _____kg__ | 2.000 |
| Confectioner's sugar _____kg__ | 10.000 |
| Deionized water _____lt__ | 11.000 |

[1] Equivalent to 32.4 grams of solids.

Procedure for the core

Place the hydrochloride, reserpine triturate, lactose, corn starch and stearic acid, all previously screened through a 16 mesh screen, in the Readco mixer. Mix for 20 minutes at low speed (34 r.p.m.).

Dissolve the acacia in 20.0 lt. of hot deionized water. Melt the polyethylene glycol 6000 on a water bath and, when melted, add to the acacia solution. Dissolve the color FD & C Green No. 3 in 2.0 lt. of hot deionized water and add to the acacia solution. Place this solution into the pressure cylinder and spray into the Readco mixer using a Teejet No. 11002 nozzle at 60 pounds/square inch of nitrogen gas. Granulate for 40 minutes total time, or until granules form.

Pass the wet mass through a Fitzpatrick comminuting machine set at low speed, knives forward, using a Type A, No. 4A screen. Place on trays and dry using 38° C. (100° F.) heat and circulating, dehumidified air.

When moisture content as determined by the Cenco Moisture Balance is 2.0%–3.0%, grind using a Tornado comminuting machine using a No. 16 mesh screen, 2 knives, and low speed. Granulation is now ready for compressing.

Procedure for the coating

Blend the benzothiadiazine and approximately 15.0 kg. of lactose and pass through a Fitzpatrick comminuting machine set at medium speed, knives forward, using a Type C, No. 16 screen. Place this in the Readco mixer and add the balance of the lactose, confectioner's sugar, 1.0 kg. acacia and stearic acid powder, all previously screened through a 16 mesh screen.

Dissolve 1.0 kg. of acacia in 9.0 lt. of hot deionized water. Melt the polyethylene glycol 4000 monostearate on a steam bath to 90° C. and add to the acacia solution. Dissolve the color FD & C Red No. 2 in 1.0 lt. of hot deionized water and color FD & C Yellow No. 5 and color FD & C Yellow No. 6 in 1.0 lt. of hot deionized water and add the yellow color solution, then the red color solution, to the acacia solution and heat to 80° C. Rinse color container with the betose and add to the acacia mixture. Place this solution into the pressure cylinder, preheated with hot deionized water, and spray into the Readco mixer using a Teejet No. 11002 nozzle at 60 pounds/square inch of nitrogen gas. Granulate for 40 minutes total time, or until granules form and no red spots are visible.

Pass the wet mass through a Fitzpatrick comminuting machine at low speed, knives forward, using a Type A, No. 5 screen. Place on trays and dry at 38° C. (100° F.) with circulating, dehumidified air.

When the moisture content as determined by the Cenco Moisture Balance is between 2.0% and 3.0%, grind the granules using a Tornado comminuting machine, set at medium speed, 6 knives, using a 25 mesh screen. Granulation is now ready for compressing.

The compressed core tablets weigh 100 mg. and are $\frac{8}{32}$ inch in diameter, having a thickness of approximately 2.8 mm. The coated tablets weigh 300 mg. and are $\frac{11}{32}$ inch in diameter, having a thickness of approximately 3.7 mm. Thus, one may substitute an equivalent amount of the diuretic benzothiadiazine-1,1-dioxide used in the examples, for that of the other compounds specifically listed in column 5, or syrosingopine, deserpidine or rescinnamine instead of reserpine, to obtain analogous compositions.

What is claimed is:

1. A pharmaceutical composition in oral dosage unit form, comprising essentially (1) about 1 to 20% of 2-$R_2$-3-$R_1$-4-$R_3$-6-$R_5$-7-(N-$R_4$-sulfamyl) - 3,4 - dihydro-2H-1,2,4-benzothiadiazine-1,1-dioxide in which $R_1$ stands for a member selected from the group consisting of lower alkenyl, cycloalkyl and cycloalkyl-lower alkyl with 3 to 6 ring-carbon atoms, cycloalkenyl and cycloalkenyl-lower alkyl with 5 to 6 ring-carbon atoms, halogeno-lower alkyl, di-lower alkylamino-lower alkyl, lower alkanoyl-lower alkyl, lower alkoxy-lower alkyl, halogeno-lower alkoxy-lower alkyl, phenoxy-lower alkyl, lower alkylmercapto-lower alkyl, halogeno-lower alkylmercapto-lower alkyl, phenylmercapto-lower alkyl, phenyl-lower alkylmercapto-lower alkyl, phenyl and phenyl-lower alkyl, $R_2$ stands for a member selected from the group consisting of hydrogen and lower alkyl, $R_2$ being lower alkyl when $R_1$ is phenyl-lower alkyl, each of $R_3$ and $R_4$ stand for hydrogen and $R_5$ stands for halogen, (2) about 1 to 60% of a member selected from the group consisting of 1-hydrazino-phthalazine, 1-hydrazino-4-methyl-phthalazine, 1,4-dihydrazino-phthalazine and a pharmacologically acceptable acid addition salt of said phthalazines and (3) about 0.005 to 0.5% of a member selected from the group consisting of methyl 11-$R_6$-18-O$R_7$-reserpate and a pharmacologically acceptable acid addition salt thereof, in which $R_6$ stands for a member selected from the group consisting of hydrogen and methoxy and $R_7$ stands for a member selected from the group consisting of 3,4,5-trimethoxy-benzoyl, 3,4,5-trimethoxy-cinnamoyl and 3,5-dimethoxy-4-carbethoxy-benzoyl.

2. A pharmaceutical composition as claimed in claim 1, comprising essentially about 1 to 15% of the ingredient shown under (1), about 1 to 20% of the ingredient shown under (2) and about 0.01 to 0.05% of the ingredient shown under (3).

3. A pharmaceutical composition as claimed in claim 1, comprising essentially about 1.5 to 2.5% of the ingredient shown under (1), about 1.5 to 2.5% of the ingredient shown under (2) and about 0.01% of the ingredient shown under (3).

4. A pharmaceutical composition comprising essentially about 10 to 25 mg. of 6-chloro-7-sulfamyl-3,4-dihydro-2H-1,2,4-benzothiadiazine-1,1-dioxide, about 10 to 25 mg. of a member selected from the group consisting of 1-hydrazino-phthalazine and 1,4 - dihydrazino - phthalazine and a member selected from the group consisting of about 0.1 mg. of reserpine, about 0.4 mg. of rescinnamine and about 0.1 to 0.5 mg. deserpidine.

5. A pharmaceutical composition as claimed in claim 1, comprising essentially about 0.6 to 20 mg. of 2-methyl-3-chloromethyl-6-chloro-7-sulfamyl-3,4-dihydro-2H-1,2,4- benzothiadiazine-1,1-dioxide, about 10 to 25 mg. of a member selected from the group consisting of 1-hydrazino-phthalazine and 1,4-dihydrazino-phthalazine and a member selected from the group consisting of about 0.1 mg. of reserpine, about 0.4 mg. of rescinnamine and about 0.1 to 0.5 mg. deserpidine.

6. A pharmaceutical composition as claimed in claim 1, comprising essentially about 0.5 to 16 mg. of 3-dichloromethyl-6-chloro-7-sulfamyl-3,4-dihydro-2H - 1,2,4-benzothiadiazine-1,1-dioxide, about 10 to 25 mg. of a member selected from the group consisting of 1-hydrazino-phthalazine and 1,4-dihydrazino-phthalazine and a member selected from the group consisting of about 0.1 mg. of reserpine, about 0.4 mg. of rescinnamine and about 0.1 to 0.5 mg. deserpidine.

7. A pharmaceutical composition as claimed in claim 1, comprising essentially about 0.25 to 8 mg. of 2-methyl-3 - (2,2,2-trifluoro-ethylmercaptomethyl)-6-chloro-7-sulfamyl - 3,4 - dihydro-2H-1,2,4-benzothiadiazine - 1,1 - dioxide, about 10 to 25 mg. of a member selected from the group consisting of 1-hydrazino-phthalazine and 1,4-dihydrazino-phthalazine and a member selected from the group consisting of about 0.1 mg. of reserpine, about 0.4 mg. of rescinnamine and about 0.1 to 0.5 mg. deserpidine.

8. A pharmaceutical composition as claimed in claim 1, comprising essentially about 0.25 to 4 mg. of 3-(5-norbornen-2-yl)-6-chloro-7-sulfamyl - 3,4 - dihydro - 2H-1,2,4-benzothiadiazine-1,1-dioxide, about 10 to 25 mg. of a member selected from the group consisting of 1-hydrazino-phthalazine and 1,4-dihydrazino-phthalazine and a member selected from the group consisting of about 0.1 mg. of reserpine, about 0.4 mg. of rescinnamine and about 0.1 to 0.5 mg. deserpidine.

9. A pharmaceutical composition comprising essentially about 0.6 to 100 mg. of 3-benzyl-6-trifluoromethyl-7-sulfamyl-3,4-dihydro - 2H - 1,2,4-benzothiadiazine-1,1-dioxide, about 10 to 25 mg. of a member selected from the group consisting of 1-hydrazino-phthalazine and 1,4-dihydrazino-phthalazine and a member selected from the group consisting of about 0.1 mg. of reserpine, about 0.4 mg. of rescinnamine and about 0.1 to 0.5 mg. deserpidine.

References Cited
UNITED STATES PATENTS 3,288,678   11/1966   De Stevens et al. ____ 424—246

ALBERT T. MEYERS, Primary Examiner

JAMES V. COSTIGAN, Assistant Examiner

U.S. Cl. X.R.

424—250, 262

Disclaimer 3,499,082.—*George De Stevens*, Woodland Park, Summit, and *Lincoln Harvey Werner*, Summit, N.J. HYPOTENSIVE COMPOSITIONS CONTAINING A 3,4-DIHYDRO-1,2,4-BENZO—THIADIAZINE-1,1-DIOXIDE, A HYDRAZINO—PHTHALAZINE AND AN INDOLE ALKALOID OF THE APOCYNACEAE FAMILY. Patent dated Mar. 3, 1970. Disclaimer filed Feb. 20, 1981, by the assignee, *Ciba-Geigy Corp.*

The term of this patent subsequent to Mar. 31, 1981, has been disclaimed.
[*Official Gazette May 19, 1981.*]